(12) United States Patent
Iguchi

(10) Patent No.: US 10,797,355 B2
(45) Date of Patent: Oct. 6, 2020

(54) NON-AQUEOUS ELECTROLYTE SECONDARY BATTERY

(71) Applicant: Toyota Jidosha Kabushiki Kaisha, Toyota-shi, Aichi-ken (JP)

(72) Inventor: Hiroki Iguchi, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 11 days.

(21) Appl. No.: 16/253,716

(22) Filed: Jan. 22, 2019

(65) Prior Publication Data

US 2019/0229374 A1 Jul. 25, 2019

(30) Foreign Application Priority Data

Jan. 23, 2018 (JP) ................. 2018-008906

(51) Int. Cl.
*H01M 10/00* (2006.01)
*H01M 10/0585* (2010.01)
*H01M 10/0525* (2010.01)
*H01M 10/42* (2006.01)
*H01M 10/04* (2006.01)
*H01M 2/04* (2006.01)

(52) U.S. Cl.
CPC ... *H01M 10/0585* (2013.01); *H01M 10/0413* (2013.01); *H01M 10/0525* (2013.01); *H01M 10/4235* (2013.01); *H01M 2/04* (2013.01); *H01M 2220/20* (2013.01)

(58) Field of Classification Search
CPC ......... H01M 10/0525; H01M 10/0413; H01M 10/0585; H01M 2220/20
See application file for complete search history.

(56) References Cited

U.S. PATENT DOCUMENTS

2011/0111296 A1* 5/2011 Berdichevsky ..... H01M 4/0428
429/218.1
2017/0358799 A1* 12/2017 Gunji ..................... C01G 53/00

FOREIGN PATENT DOCUMENTS

JP H0624144 B2 3/1994
JP 2015-225727 A 12/2015
JP 2017098156 A 6/2017

* cited by examiner

*Primary Examiner* — Cynthia H Kelly
*Assistant Examiner* — Monique M Wills
(74) *Attorney, Agent, or Firm* — Dinsmore & Shohl LLP

(57) ABSTRACT

A non-aqueous electrolyte secondary battery includes a housing, a stack-type electrode array accommodated in the housing, and an electrolyte solution. The electrolyte solution includes an infiltrated portion infiltrated into the stack-type electrode array and an excess portion other than the infiltrated portion. In a set-up state that the non-aqueous electrolyte secondary battery is arranged such that a direction of stack of the stack-type electrode array is orthogonal to a vertical direction, a lower end of the separator projects below lower ends of the positive electrode and the negative electrode. In the set-up state, within a range of an operating state of charge, a projecting portion of any of the plurality separators is always in contact with the excess portion and the plurality of positive electrodes and the plurality of negative electrodes are not in contact with the excess portion at any time.

3 Claims, 6 Drawing Sheets

(a) WHEN ALLOWABLE SOC IS AT UPPER LIMIT (b) WHEN ALLOWABLE SOC IS AT LOWER LIMIT (a) WHEN ALLOWABLE SOC IS AT UPPER LIMIT (b) WHEN ALLOWABLE SOC IS AT LOWER LIMIT

NON-AQUEOUS ELECTROLYTE SECONDARY BATTERY

CROSS-REFERENCE TO RELATED APPLICATIONS

This nonprovisional application claims priority to Japanese Patent Application No. 2018-008906 filed with the Japan Patent Office on Jan. 23, 2018, the entire contents of which are hereby incorporated by reference.

BACKGROUND

Field

The present disclosure relates to a non-aqueous electrolyte secondary battery.

Description of the Background Art

Japanese Patent Laying-Open No. 2017-098156 describes suppression of occurrence of dry-up of an electrolyte solution (shortage of an amount of an electrolyte solution held by an electrode) in one of a positive electrode and a negative electrode and suppression of increase in, resistance of a battery in repeated charging and discharging at a high rate, by balancing, between the positive electrode and the negative electrode, an amount of the electrolyte solution held therein in a non-aqueous electrolyte secondary battery.

SUMMARY

In a conventional non-aqueous electrolyte secondary battery as disclosed in Japanese Patent Laying-Open No. 2017-098156, when a part (a lower portion) of an electrode (a positive electrode 10 and a negative electrode 20) is in contact with an excess portion 4 (a portion not infiltrated into an electrode and array 50) of an electrolyte solution (see FIG. 3), the electrolyte solution is excessive in that portion and an amount of formed solid electrolyte interface (SEI) film increases and a resistance in a vertical direction of the electrode is varied. Such variation in resistance leads to tendency of local precipitation of Li at a surface of the electrode (lowering in resistance against precipitation of Li).

Decrease in amount of the electrolyte solution for avoiding contact with the electrode, however, may lead to a state that the excess portion, of the electrolyte solution is not in contact with an electrode array (see FIG. 2) during charging and discharging at a high rate. Since the excess portion of the electrolyte solution cannot reversibly be returned to the electrode array in this state, characteristics of the battery deteriorate with dry-up of the electrolyte solution or change in concentration of salt in the electrode array. Namely, high-rate performance of the non-aqueous electrolyte secondary battery disadvantageously lowers.

Therefore, an object of the present disclosure is to provide a non-aqueous electrolyte secondary battery improved in resistance against precipitation of Li by suppression of variation in resistance of an electrode and improved in high-rate performance by suppression of dry-up or change in concentration of salt of an electrolyte solution in an electrode array.

[1] A non-aqueous electrolyte secondary battery according to the present disclosure includes a housing, a stack-type electrode array accommodated in the housing, and an electrolyte solution. The electrolyte solution includes an infiltrated portion infiltrated into the stack-type electrode array and an excess portion other than the infiltrated portion. The stack-type electrode at ray includes a plurality of positive electrodes, a plurality of negative electrodes, and a plurality of separators, and is formed by alternately stacking the positive electrode and the negative electrode with the separator being interposed. In a set-up state that the non-aqueous electrolyte secondary battery is arranged such that a direction of stack of the stack-type electrode array is orthogonal to a vertical direction, the non-aqueous electrolyte secondary battery is constructed such that a lower end of the separator projects below lower ends of the positive electrode and the negative electrode. In the set-up state, the non-aqueous electrolyte secondary battery is constructed such that a projecting portion of any of the plurality of separators is always in contact with the excess portion and the plurality of positive electrodes and the plurality of negative electrodes are not in contact with the excess portion at any time, within a range of an operating state of charge in which a state of charge of the non-aqueous electrolyte secondary battery is not lower than a lower limit value of an allowable state of charge and not higher than an upper limit value of the allowable state of charge.

According to the present disclosure, the projecting portion of the separator is always in contact with the excess portion of the electrolyte solution so that the electrolyte solution can reversibly be returned from the excess portion to the electrode array through the separator. Therefore, dry-up or change in concentration of salt, of the electrolyte solution in the electrode array is suppressed, so that high-rate performance of the non-aqueous electrolyte secondary battery is improved. Since the electrode is not in contact with the excess portion of the electrolyte solution at any time, variation in resistance of the electrode is suppressed. Thus, resistance against precipitation of Li of the non-aqueous electrolyte secondary battery is improved.

[2] In the set-up state, the projecting portion of any of the plurality of separators is in contact with the housing in some embodiments. In this case, dry-up or change in concentration of salt of the electrolyte solution is more reliably suppressed and high-rate performance of the non-aqueous electrolyte secondary battery is improved. This is because, when the projecting portion of the separator is in contact with (an inner wall of a bottom of) the housing in the set-up state, the separator can more reliably be in contact with the excess portion of the electrolyte solution stored at the bottom of the housing.

[3] In some embodiments, the lower limit value of the allowable state of charge is not higher than 20% and the upper limit value of the allowable state of charge is not lower than 80%. In this case, even though the range of the allowable state of charge is wide (the lower limit value of the allowable state of charge is set to 20% and the upper limit value of the allowable state of charge is set to 80%), variation in resistance of the electrode is more reliably suppressed so that resistance against precipitation of Li of the non-aqueous electrolyte secondary battery is improved. Dry-up or change in concentration of salt of the electrolyte solution is suppressed so that high-rate performance of the non-aqueous electrolyte secondary battery is improved.

The foregoing and other objects, features, aspects and advantages of the present disclosure will become more apparent from the following detailed description of the present disclosure when taken in conjunction with the accompanying drawings.

DETAILED DESCRIPTION

An embodiment of the present disclosure (which is denoted as the "present embodiment" below) will be described below. The description below, however, does not limit the scope of the present disclosure.

<Non-Aqueous Electrolyte Secondary Battery>

A "non-aqueous electrolyte secondary battery" herein refers to a battery without containing water in an electrolyte. The non-aqueous electrolyte secondary battery may be abbreviated as a "battery" below.

Figure 6:
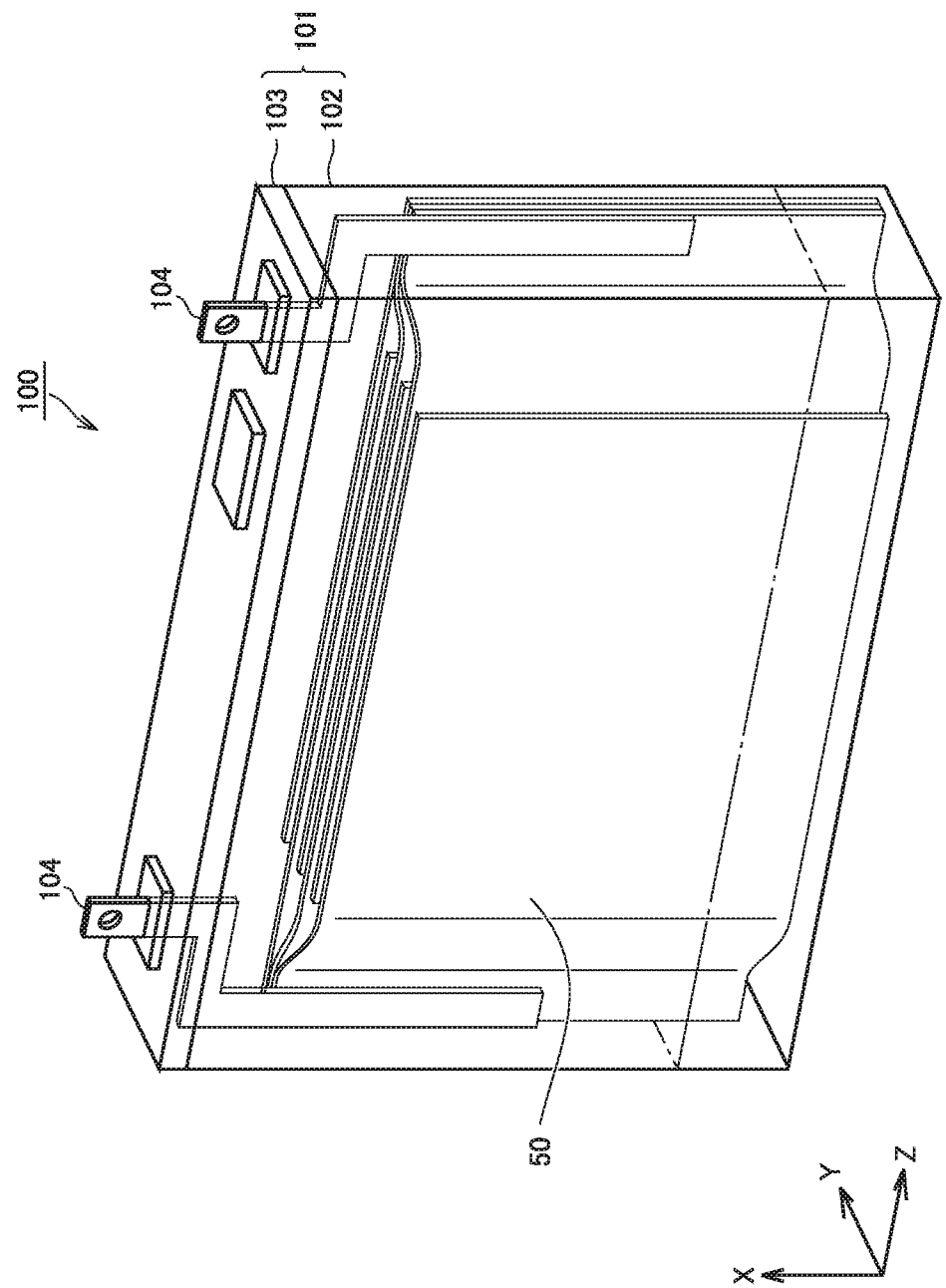
FIG. 6 is a schematic diagram showing one example of a non-aqueous electrolyte secondary battery in the embodiment.

FIG. 6 is a schematic diagram showing one example of a non-aqueous electrolyte secondary battery in the present embodiment. A battery 100 is prismatic. The battery in the present embodiment should not be limited to be prismatic. The battery in the present embodiment may be cylindrical.

Battery 100 in the present embodiment includes a housing 101 and a stack-type electrode array 50 and an electrolyte solution accommodated in housing 101. The stack-type electrode array 50 may be abbreviated as an "electrode array" below.

Housing 101 is hermetically sealed. Housing 101 can be made, for example, of a metal. Housing 101 can be made, for example, of an aluminum (Al) alloy. So long as the housing 101 can hermetically be sealed, the housing 101 may be, for example, a pouch made of an, aluminum laminated film. The battery 100 in the present embodiment may be a laminated battery.

Housing 101 includes a container 102 and a lid 103. Lid 103 is joined to container 102, for example, with laser welding. An external terminal 104 is provided in lid 103. Lid 103 may be provided with a liquid introduction port, a gas exhaust valve, and a current interrupt device (CID), although they are not shown. Housing 101 accommodates an electrode array 50 and an electrolyte solution (an excess portion 4 and an infiltrated portion). Electrode array 50 is electrically connected to external terminal 104.

Figure 1:
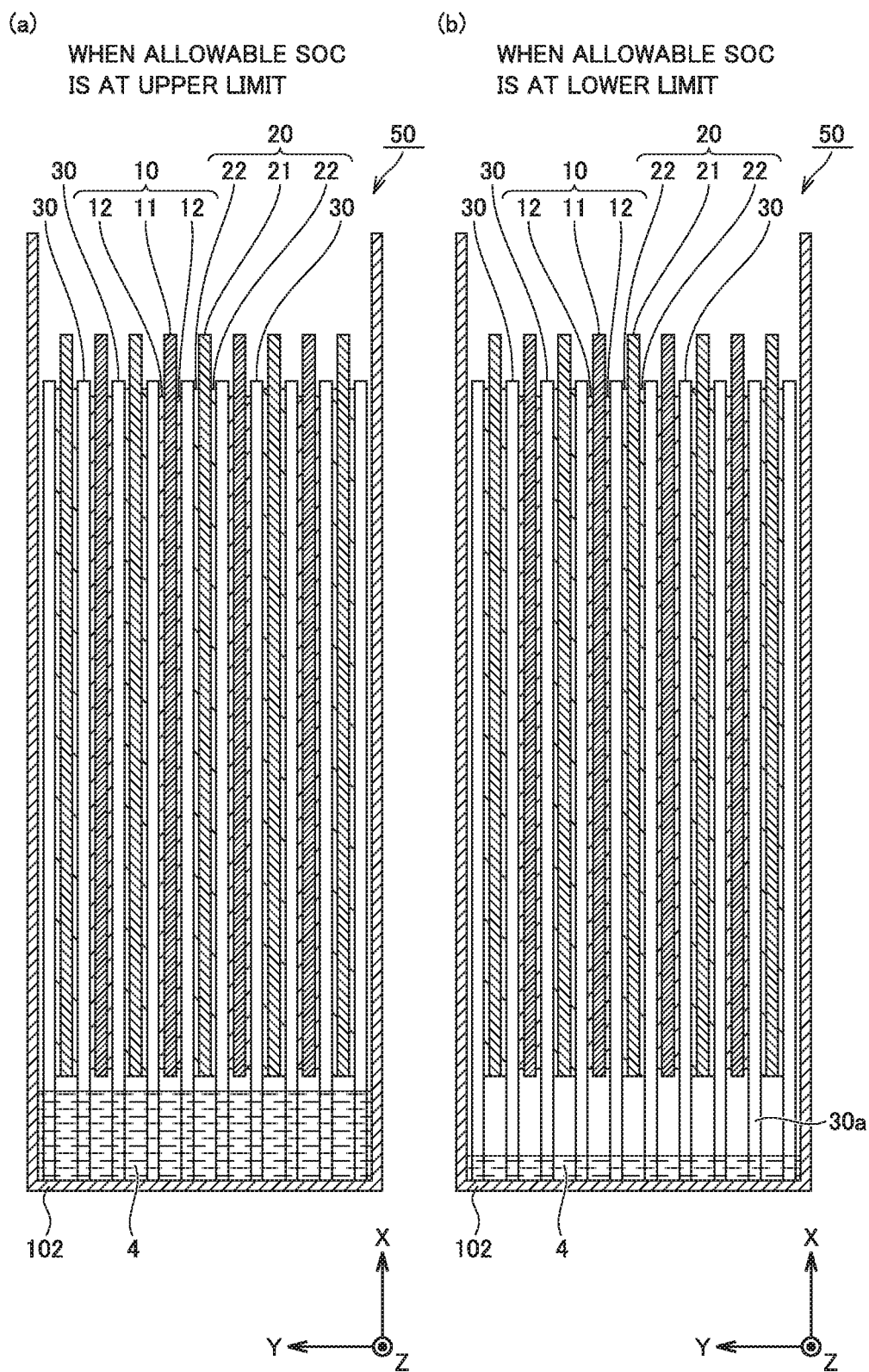
FIG. 1 is a schematic cross-sectional view showing one example of a construction of a non-aqueous electrolyte secondary battery in an embodiment.

FIG. 1 is a schematic cross-sectional view (a cross-sectional view along an X-Y cross-section in FIG. 6) showing one example of a construction of a non-aqueous electrolyte secondary battery in the embodiment. FIG. 1 does not show lid 103 and the like.

Electrode array 50 includes a plurality of positive electrodes 10, a plurality of negative electrodes 20, and a plurality of separators 30, and is formed by alternately stacking positive electrode 10 and negative electrode 20 with separator 30 being interposed. Electrode array 50 is of a stack (layered) type.

The electrolyte solution includes the infiltrated portion infiltrated into electrode army 50 (positive electrode 10, negative electrode 20, and separator 30) and excess portion 4 other than the infiltrated portion. Excess portion 4 of the electrolyte solution is stored for example, at the bottom of housing 101 (container 102).

In a set-up state that battery 100 is arranged such that a direction of stack (a direction of a Y axis in FIG. 1) of electrode array 50 is orthogonal to a vertical direction, the battery is wrist acted such that a lower end of separator 30 projects below lower ends of positive electrode 10 and negative electrode 20. With adoption of electrode array 50 constructed as such, the battery can be constructed such that excess portion 4 of the electrolyte solution is always in contact with separator 30 and not in contact with the electrode at any time (positive electrode 10 and negative electrode 20), by adjusting an amount of the electrolyte solution to be accommodated in housing 101 (container 102).

The battery in the present embodiment is constructed such that, in the set-up state, a projecting portion 30a of any of the plurality of separators 30 is always in contact with excess portion 4 and the plurality of positive electrodes 10 and the plurality of negative electrodes 20 are not in contact with excess portion 4 at any time, within a range of an operating state of charge in which a state of charge (SOC) of battery 100 is not lower than a lower limit value of an allowable state of charge and not higher than an upper limit value of the allowable state of charge. Therefore, the battery is constructed such that projecting portion 30a of any of the plurality of separators 30 is always in contact with excess portion 4 of the electrolyte solution and the plurality of positive electrodes 10 and the plurality of negative electrodes 20 are not in contact with excess portion 4 of the electrolyte solution at any time in each of an example in which an SOC of battery 100 is at the upper limit value of the allowable state of charge as shown in FIG. 1(a) and in, an example in which the SOC of battery 100 is at the lower limit value of the allowable state of charge as shown in FIG. 1(b). Projecting portion 30a refers to a part of separator 30 which projects below the lower end of the electrode (positive electrode 10 and negative electrode 20) in the set-up state. The state of charge (SOC) refers to a ratio of a remaining amount of charging to a charging capacity of a battery. In FIG. 1, though projecting portions 30a of all of the plurality of separators 30 are in contact with excess portion 4 of the electrolyte solution, only projecting portion 30a of at least one of the plurality of separators 30 may be in contact with excess portion 4 of the electrolyte solution.

In the set-up state, projecting portion 30a of each of the plurality of separators 30 is in contact with the housing (an inner wall at the bottom of the housing in the set-up state) in some embodiments. In this case, dry-up or change in concentration of salt of the electrolyte solution is more reliably suppressed and high-rate performance of the non-aqueous electrolyte secondary battery is more reliably improved. Though projecting portions 30a of all of the plurality of separators 30 are in contact with the housing in FIG. 1, only projecting portion 30a of at least one of the plurality of separators 30 may be in contact with the housing.

In some embodiments, the lower limit value of the allowable state of charge is not higher than 20% and the upper limit value of the allowable state of charge is not lower than 80%. In this ease, even though a range of the allowable state of charge is wide (for example, the lower limit value of the allowable state of charge is set to 20% and the upper limit value of the allowable state of charge is set to 80%), variation in resistance of the electrode is more reliably suppressed so that resistance against precipitation of Li of the non-aqueous electrolyte secondary battery is improved. Dry-up or change in concentration of salt of the electrolyte solution is suppressed so that high-rate performance of the non-aqueous electrolyte secondary battery is improved.

<<Electrode>>

Positive electrode 10 includes a positive electrode current collector 11 and a positive electrode composite material layer 12 formed on a surface of positive electrode current collector 11. Positive electrode 10 may include an exposed portion of positive electrode current collector 11 as protruding from positive electrode composite material layer 12, as a position of connection to external terminal 104.

Positive electrode current collector 11 may be, for example, an Al foil or an Al alloy foil. Positive electrode can cut collector 11 may have a thickness, for example, not smaller than 5 μm and not greater than 50 μm.

Positive electrode composite material layer 12 is formed, for example, on the surface of positive electrode current collector 11. Positive electrode composite material layer 12 may be formed on both of a front surface and a rear surface of positive electrode current collector 11. Positive electrode composite material layer 12 may have a thickness, for example, not smaller than 10 μm and not greater than 200 μm Positive electrode composite material layer 12 contains at least a positive electrode active material. Positive electrode composite material layer 12 may further contain a binder, a thickening material, and a conductive material.

The positive electrode active material can be particulate. The positive electrode active material may have d50, for example, not smaller than 1 μm and not greater than 30 μm. The positive electrode active material should not particularly be limited. The positive electrode active material may be, for example, $LiCoO_2$, $LiMnO_2$, $LiMn_2O_4$, $LiNi_pCo_qM_rO_2$ (where M represents Mn or Al and p, q, and r satisfy conditions of $0<p<1$, $0<q<1$, $0<r<1$, and $p+q+r=1$), or $LiFePO_4$. One type of positive electrode active material may be used alone. Two or more types of positive electrode 10 active materials may be used as being combined.

The binder should not particularly be limited. The binder may be, for example, carboxymethyl cellulose (CMC), polyvinylidene difluoride (PVDF), styrene-butadiene rubber (SBR), polytetrafluoroethylene (PTFE), or polyacrylic acid (PAA). One type of binder may be used alone. Two or more types of binders may be used as being combined. A content of the binder may be, for example, not smaller than 1 part by mass and not greater than 10 parts by mass with respect to 100 parts by mass of positive electrode active material.

The thickening material should not particularly be limited. The thickening material may be, for example, UMC, alginic acid, hydroxypropyl methylcellulose (HPMC), polyethylene oxide (PEO), polyacrylic acid (PAA), or a polysaccharide thickener. One type of thickening material may be used alone. Two or more types of thickening materials may be used as being combined. A content of the thickening material may be, for example, not smaller than 1 part by mass and not greater than 10 parts by mass with respect to 100 parts by mass of positive electrode active material. The conductive material should not particularly be limited. The conductive material may be, for example, carbon black such as acetylene black (AB), thermal black, or furness black. One type of conductive material may be used alone. Two or more types of conductive materials may be used as being combined. A content of the conductive material may be, for example, not smaller than 1 part by mass and not greater than 10 parts by mass with respect to 100 parts by mass of positive electrode active material.

<<Negative Electrode>>

Negative electrode 20 includes a negative electrode current collector 21 and a negative electrode composite material layer 22 formed on a surface of negative electrode current collector 21. Negative electrode 20 may include an exposed portion of negative electrode current collector 21 as protruding from negative electrode composite material layer 22, as a position of connection to external terminal 104.

Negative electrode current collector 21 may be, for example, a Cu foil. The Cu foil may be a pure Cu foil or a Cu alloy foil. Negative electrode current collector 21 may have a thickness, for example, from 5 to 30 μm.

Negative electrode composite material layer 22 is formed on the surface (both or one of front and rear surfaces) of negative electrode current collector 21. Negative electrode composite material layer 22 may have a thickness, for example, from 10 to 200 μm or from 50 to 150 μm.

Negative electrode composite material layer 22 contains a negative electrode active material. Negative electrode composite material layer 22 may further contain a binder, a thickening material, and a conductive material similarly to positive electrode composite material layer 12.

Examples of the negative electrode active material include a carbon-based negative electrode active material such as graphite, soft carbon, and hard carbon and an alloy-based negative electrode active material containing silicon (Si) or tin (Sn). One type of negative electrode active material may be used alone or two or more types of negative electrode active materials may be used as being combined. The negative electrode active material may have an average particle size, for example, approximately from 1 to 25 μm.

<<Separator>>

Separator 30 is interposed between positive electrode 10 and negative electrode 20. Separator 30 is an electrically insulating porous film. Separator 30 may have a thickness, for example, from 10 to 50 μm. Separator 30 can be composed, for example, of polyethylene (PE) or polypropylene (PP). Separator 30 may have a multi-layered structure. Separator 30 may be formed, for example, by stacking porous film composed of PP, a porous film composed of PE, and a porous film composed of PP in this order. In the present embodiment, separator 30 serves to electrically isolate positive electrode 10 and negative electrode 20 from each other and also to supply the electrolyte solution to positive electrode 10 and negative electrode 20 by sucking up the electrolyte solution from excess portion 4 of the electrolyte solution.

<<Electrolyte Solution (Non-Aqueous Electrolyte)>>

The electrolyte solution contains at least lithium (Li) salt and a solvent. The electrolyte solution may contain, for example, at least 0.5 mol/L and at most 2 mol/L of Li salt. The Li salt is a supporting electrolyte. The Li salt is dissolved in the solvent. The Li salt may be, for example, $LiPF_6$, $LiBF_4$, $Li[N(FSO_2)_2]$, or $Li[N(CF_3SO_2)_2]$. One type of Li salt may be, used alone. Two or more types of Li salt may be used as being combined.

The solvent is aprotic. Namely, the electrolyte solution in the present embodiment is a non-aqueous electrolyte. The solvent may be, for example, a mixture of cyclic carbonate and chain carbonate. A ratio of mixing may be set, for example, to "cyclic carbonate:chain carbonate=1:9 to 5:5 (at a volume ratio)."

Cyclic carbonate may be, for example, ethylene carbonate (EC), propylene carbonate (PC), butylene carbonate (BC), or fluoroethylene carbonate (FEC). One type of cyclic carbonate may be used alone. Two or more types of cyclic carbonate may be used as being combined.

Chain carbonate may be, for example, dimethyl carbonate (DMC), ethyl methyl carbonate (EMC), or diethyl carbonate (DEC). One type of chain carbonate may be used alone. Two or more types of chain carbonate may be used as being combined.

The solvent may include, for example, lactone, cyclic ether, chain ether, and carboxylate. Lactone may be, for example, γ-butyrolactone (GBL) or δ-valerolactone. Cyclic ether may be, for example, tetrahydrofuran (THF), 1,3-dioxolane, or 1,4-dioxane. Chain ether may be 1,2-dimethoxyethane (DME). Carboxylate may be, for example, methyl formate (MF), methyl acetate (MA), or methyl propionate (MP).

Though the description about the non-aqueous electrolyte secondary battery above is mainly description about a lithium ion secondary battery, the non-aqueous electrolyte secondary battery is not limited to the lithium ion secondary battery but it may be another non-aqueous electrolyte secondary battery such as a lithium metal secondary battery.

<Application>

The non-aqueous electrolyte secondary battery (lithium ion secondary battery) in the present embodiment can be used as a power supply for such a vehicle as a hybrid vehicle (HV) an electric vehicle (LV), and a plug-in hybrid vehicle (PHV), Applications of the non-aqueous electrolyte secondary battery in the present disclosure, however, are not limited to such applications. Without being limited as such, the non-aqueous electrolyte secondary battery in the present disclosure is applicable to each sand every application such as a rechargeable battery for home use.

EXAMPLES

Examples will be described below. The examples below do not limit the scope of the present disclosure.

Example 1

<<Manufacturing of Positive Electrode>>

Materials below were prepared.

Positive electrode active material: $LiNi_{0.5}Co_{0.2}Mn_{0.3}O_2$ (NCM523)

Conductive material: AB

Binder: PVDF

Solvent: N-methylpyrrolidone (NMP)

Positive electrode current collector: aluminum foil (having a thickness of 15 μm)

Ninety-six parts by mass of positive electrode active material, 2 parts by mass of conductive material, and 2 parts by mass of binder were mixed in a solvent. A positive electrode composite material paste was thus prepared. A positive electrode composite material layer was formed by applying the positive electrode composite material paste to both surfaces of a positive electrode current collector with a die coater and drying the paste. A positive electrode in which the positive electrode composite material layer was stacked on both of the surfaces of the positive electrode current collector was thus manufactured. The positive electrode was further compressed and punched into a prescribed shape. The positive electrode composite material layer of the positive electrode thus obtained Had a shape of a 66-trim square.

<<(Manufacturing of Negative Electrode>>

Materials below were prepared,

Negative electrode active material: natural graphite (having an average particle size of 20 μm)

Binder: SBR

Thickening Material: CMC

Solvent: water

Negative electrode current collector: copper foil (having a thickness of 10 μm)

Ninety-nine parts by mass at negative electrode active material, 0.5 part by mass of binder, and 0.5 part by mass of thickening material were mixed. A negative electrode composite material paste (slurry) was prepared by further adding a solvent to the mixture and mixing and kneading the mixture. An amount of addition of the solvent was adjusted such that a ratio of a non-volatile content of the obtained negative electrode composite material paste was 54 mass %. The "ratio of a non-volatile content" means a mass ratio of a component (a non-volatile component) other than a solvent to a total mass of all source materials including the solvent.

The prepared negative electrode composite material slurry was applied to surfaces (both of front and rear surfaces) of the negative electrode current collector with a die water and dried. A negative electrode in which a negative electrode composite material layer was formed on both at the surfaces of the negative electrode current collector was obtained. The negative electrode had a thickness of 190 μm. The obtained negative electrode was cut into a 68-mm square. The negative electrode was thus manufactured.

<<Separator>>

A separator (a porous film) in a form of a band was prepared. The separator had a thickness of 25 μm. The separator had a three-layered structure. The three-layered structure was obtained by stacking a porous layer composed of polypropylene, a porous layer composed of polyethylene, and a porous layer composed of polypropylene in this order.

<<Manufacturing of Electrode Array>>

A stack-type electrode array as shown in FIG. 1 was fabricated by stacking a plurality of positive electrodes, a plurality of negative electrodes, and a plurality of separators by alternately stacking a positive electrode and a negative electrode with a separator being interposed. The separator was also stacked as au outermost layer on both of the surfaces of the electrode array.

A solvent for an electrolyte solution was prepared by mixing ethylene carbonate (EC), dimethyl carbonate (DMC), and ethyl methyl carbonate (EMC). An electrolyte solution composed as below was prepared by dissolving $LiPF_6$ in the solvent for the electrolyte solution.

Solvent for electrolyte solution: [EC:DMC:EMC=3:3:4 (at a volume ratio)]

$LiPF_6$: 1.0 mol/L

<<Assembly of Non-Aqueous Electrolyte Secondary Battery>>

A terminal (lead) was welded to a collector tab (an end of an electrode current collector) of each electrode (the positive electrode and the negative electrode) in the electrode array. The electrode array was accommodated in a housing (a prismatic housing made of an aluminum alloy). A prescribed amount of electrolyte solution was introduced into the housing and the housing was sealed. A non-aqueous electrolyte secondary battery (a stacked laminated cell) was manufactured as set forth above. A theoretical capacity (a designed capacity) of this battery was 750 mAh.

Comparative Example 1

Figure 2:
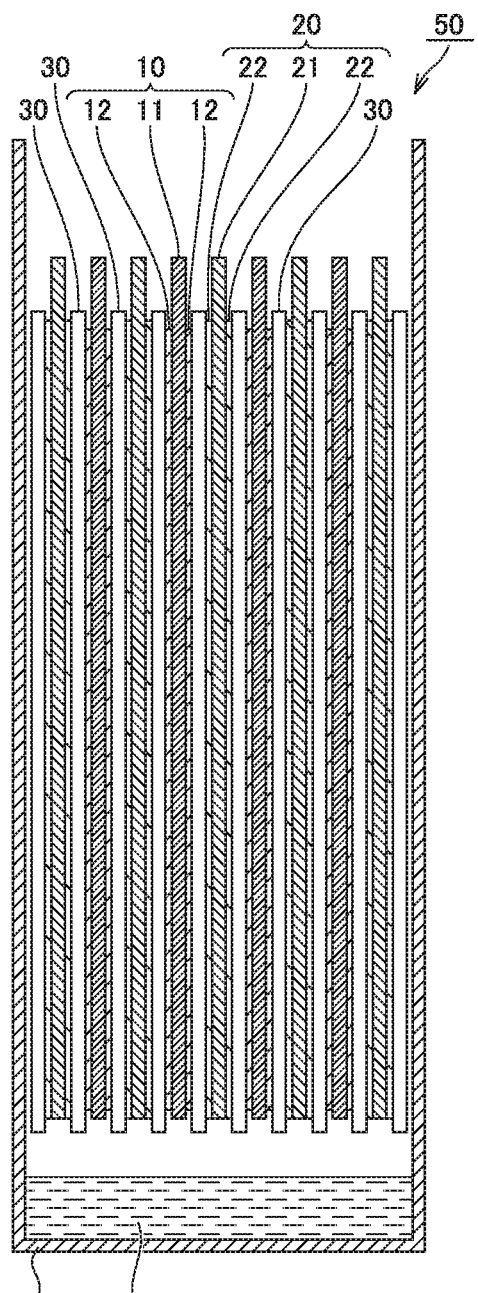
FIG. 2 is a schematic cross-sectional view showing one example of a construction or a non-aqueous electrolyte secondary battery in Comparative Example 1.
Figure 2:
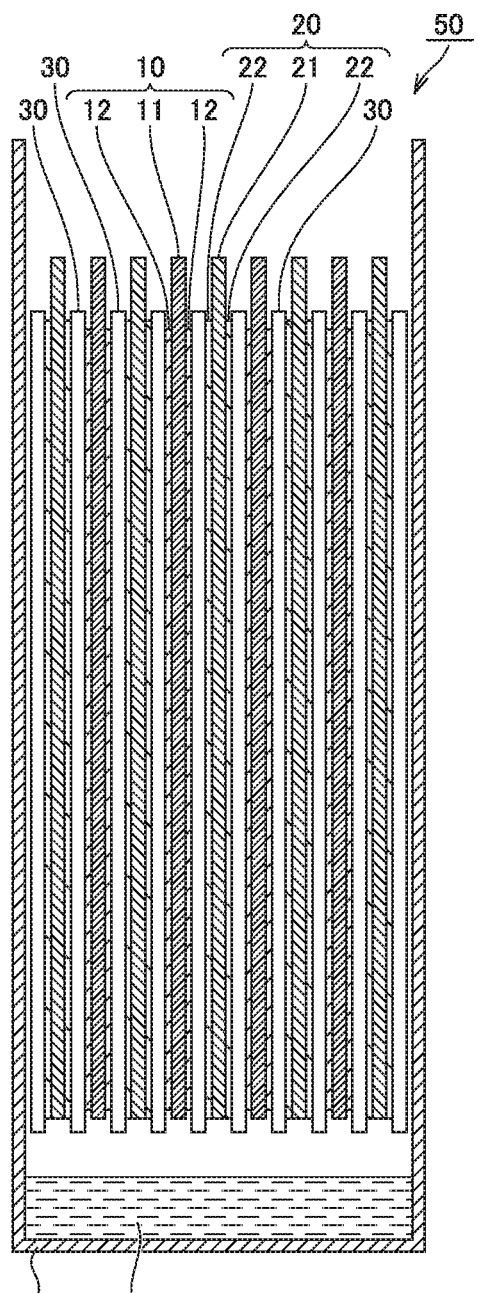

As shown in FIG. 2, a battery was constructed such that the lower end of separator 30 was substantially flush with the lower end of the electrode (positive electrode 10 and negative electrode 20). An amount of electrolyte solution to be accommodated in the housing (container 102) was adjusted such that excess portion 4 of the electrolyte solution was in contact with neither of the electrode and separator 30 at the time when an allowable SOC attained to the upper limit (an SOC of the battery attained to the upper limit value of the allowable SOC, FIG. 2(a)) and at the time when the allowable SOC attained to the lower limit (an SOC of the battery attained to the lower limit value of the allowable SOC, FIG. 2(b)) (see Table 1). The non-aqueous electrolyte secondary battery in Comparative Example 1 was otherwise manufactured as in Example 1.

Comparative Example 2

Figure 3:
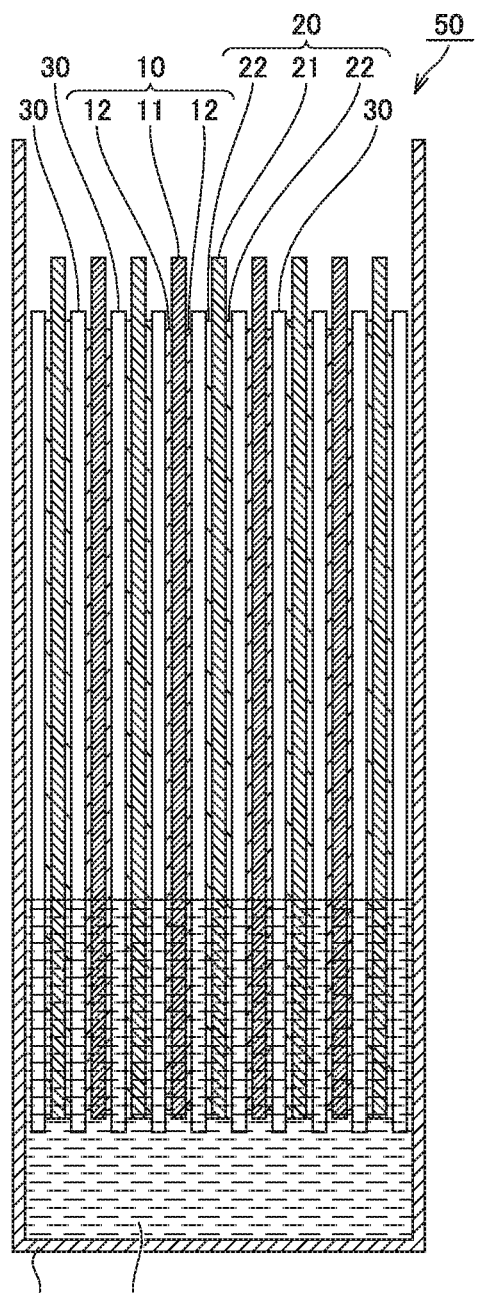
FIG. 3 is a schematic cross-sectional view showing one example of a construction of a non-aqueous electrolyte secondary battery in Comparative Example 2.
Figure 3:
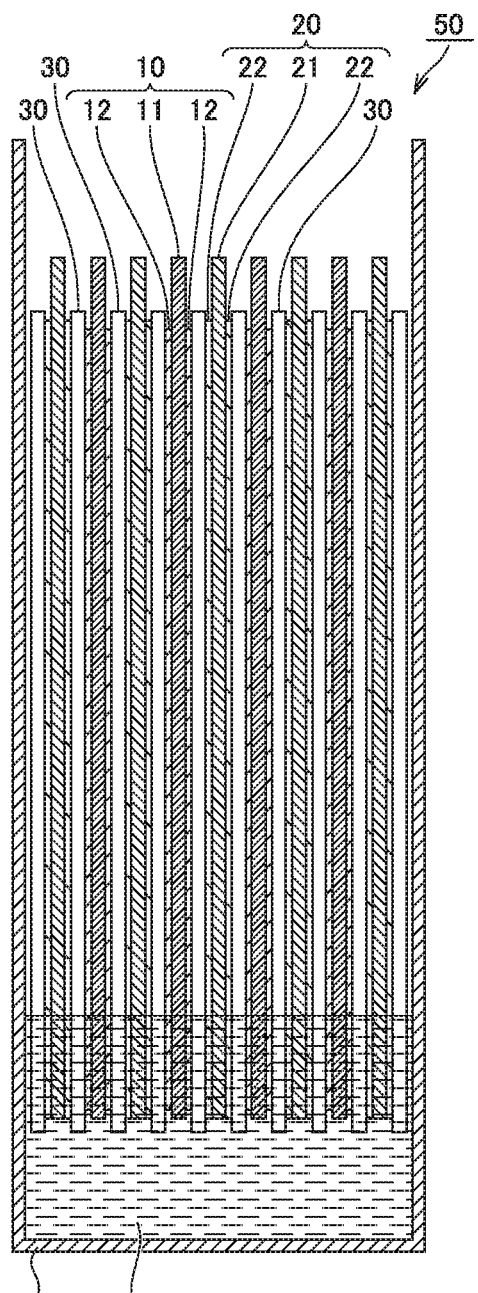

As shown in FIG. 3, an amount of electrolyte solution to be accommodated in the housing was adjusted such that excess portion 4 of the electrolyte solution was in contact with both of the electrode and separator 30 at the time when the allowable SOC attained to the upper limit (FIG. 3(a)) and at the time when the allowable SOC attained to the lower limit (FIG. 3(b)) (see Table 1). The non-aqueous electrolyte secondary battery in Comparative Example 2 was otherwise manufactured as in Comparative Example 1.

Comparative Example 3

Figure 4:
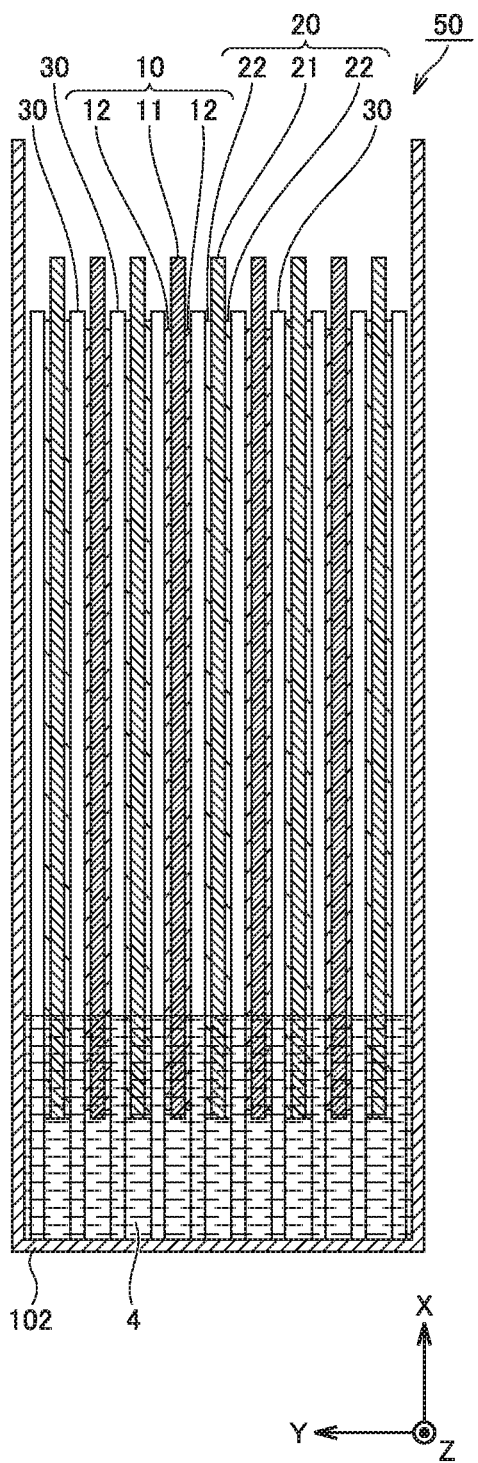
FIG. 4 is a schematic cross-sectional view showing one example of a construction of a non-aqueous electrolyte secondary battery in Comparative Example 3.
Figure 4:
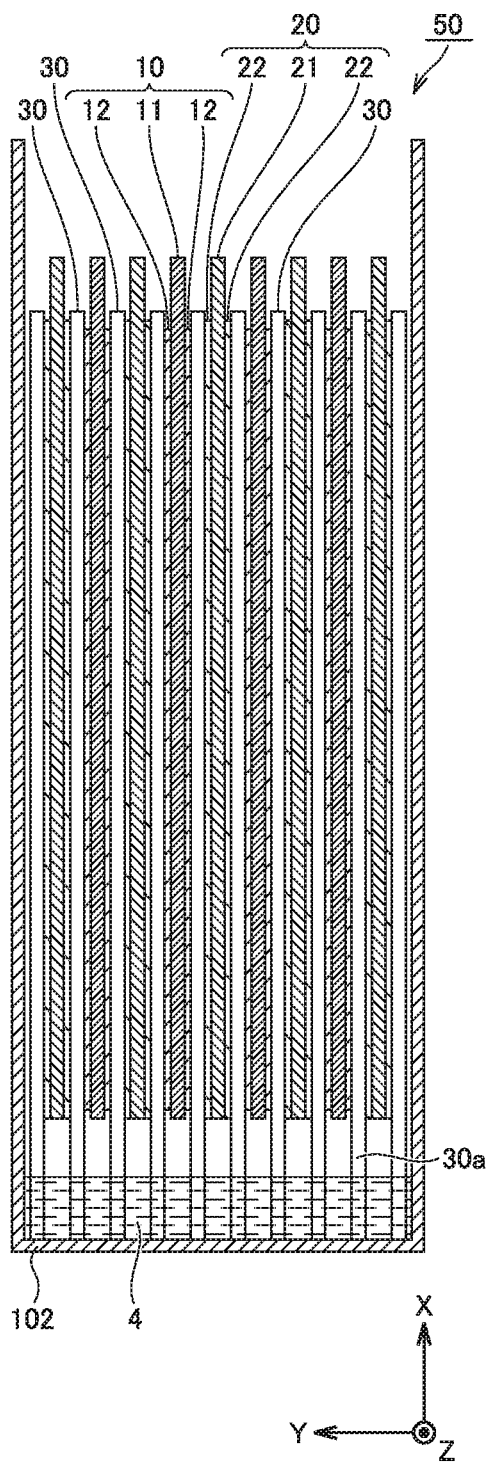

As shown in FIG. 4, an amount of electrolyte solution to be accommodated in the housing was adjusted such that excess portion 4 of the electrolyte solution was in contact with the electrode (and separator 30) at the tune when the allowable SOC attained to the upper Limit (FIG. 3(a)) and excess portion 4 of the electrolyte solution was in contact not with the electrode but with separator 30 at the time when the allowable SOC attained to the lower limit (FIG. 4(b)) (see Table 1). The non-aqueous electrolyte secondary battery in Comparative Example 3 was otherwise manufactured as in Example 1.

Comparative Example 4

Figure 5:
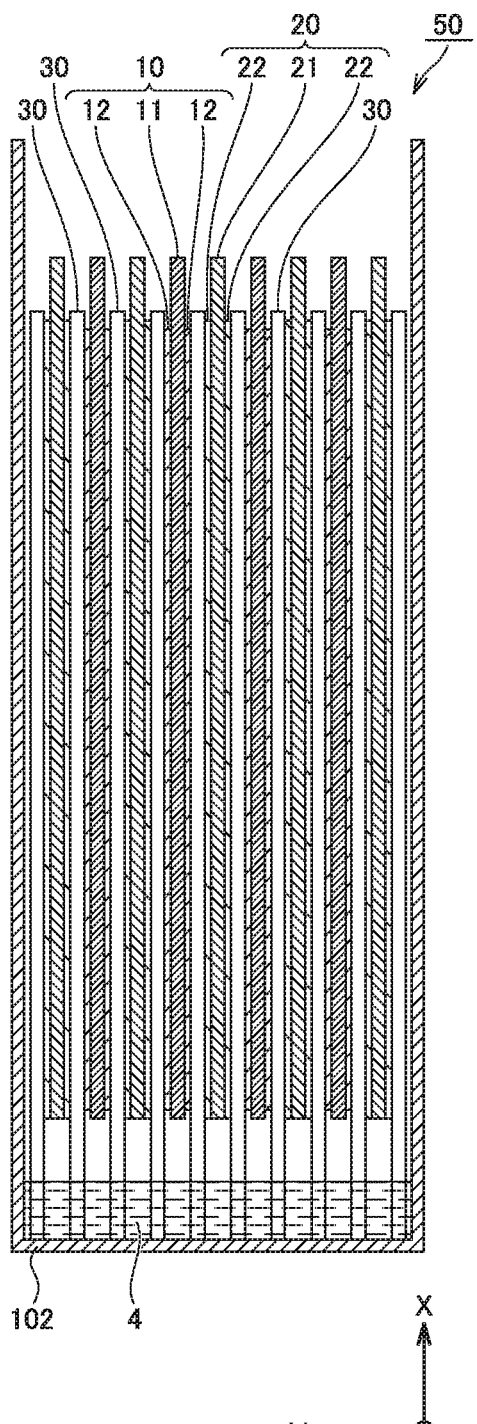
FIG. 5 is a schematic cross-sectional view showing one example of a construction of a non-aqueous electrolyte secondary battery in Comparative Example 4.
Figure 5:
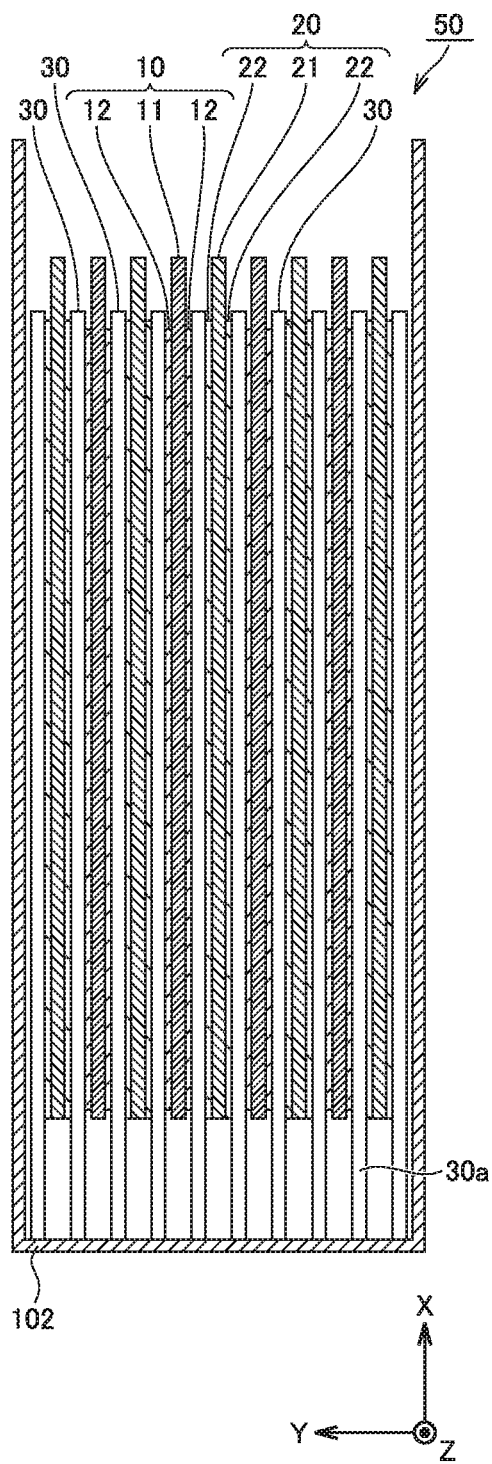

As shown in FIG. 5, an amount of electrolyte solution to be accommodated in the housing was adjusted such that excess portion 4 of the electrolyte solution was in contact not with the electrode but with separator 30 at the time when the allowable SOC attained to the upper limit (FIG. 5(a)) and excess portion 4 of the electrolyte solution was in contact with neither of the electrode and separator 30 due to exhaustion of excess portion 4 before reaching the lower limit of the allowable SOC at the time when the allowable SOC attained to the lower unit limit (FIG. 5(b)) (see Table 1). The non-aqueous electrolyte secondary battery in Comparative Example 4 was otherwise manufactured as in Example 1.

<Evaluation of Performance of Battery>
[Evaluation of High-Rate Performance]
One hundred cycles of a charging and discharging cycle test were performed under conditions below.
(Conditions for Charging and Discharging Cycle)
Temperature: 0° C.
SOC: 10 to 85%
Test pattern: charging at 10 C→rest for one minute→discharging at 1 C→rest for one minute The batteries in Example 1 and Comparative Examples 1-4 charged to 10% of the state of charge (SOC) were, prepared. In an environment at 0° C. the battery was charged at a current rate of 10 C until the SOC attained to 35%. Alter rest for one minute, the battery was discharged at a current rate of 1 C until the SOC attained to 10%. After rest for one minute, charging as above was performed. One hundred cycles in total of charging and discharging were repeated, with such charging and discharging being defined as one cycle. "C" represents a unit of a current rate. "1 C" represents a current rate at which a state of charge (SOC) reaches 100% from 0% by charging for one hour.

An amount of lowering in voltage during discharging was measured at the time of first discharging (before the test) and last discharging (after the test) in the charging and discharging cycle test, and a resistance of the battery before and after the test was calculated based on relation between the amount of lowering in voltage and a current during discharging. Battery resistances of three batteries were measured and an, average value thereof was calculated in Example and Comparative Examples. A ratio of a battery resistance after the test to a battery resistance before the test was calculated as a rate of increase in resistance after the charging and discharging cycle test. Table 1 shows a result of measurement of a rate of increase in resistance (fields of "High-Rate Performance" "Rate of Increase in Resistance [%]"). As the rate of increase in resistance is lower, high-rate performance is evaluated as high.

[Evaluation of Resistance Against Precipitation of Li]
The battery in each of Example 1 and the Comparative Examples was charged until the SOC attained to 85% and thereafter stored for thirty days in an environtnent at 60° C. After storage, the battery was subjected to 300 cycles of charging and discharging cycle test with a current value x (A) for charging and discharging being varied under conditions below.
(Conditions for Charging and Discharging Cycle)
Temperature: 0° C.
SOC: 85%
Test pattern: chanting (x A, ten seconds)→rest (one minute)→discharging (x A, ten seconds)→rest (one minute) [x=60, 65, 70, 75, 80, 85]

The battery was disassembled after the charging and discharging cycle test and whether or not Li precipitated was visually checked. Table 1 shows a maximum value x (A) of a charging and discharging current among conditions under which no precipitation of Li was observed for each of the batteries in Example 1 and Comparative Examples (field of (Resistance Against Precipitation of Li) "Current [A]"). As this value is higher, resistance against precipitation of Li (performance of suppression of precipitation of Li) is evaluated as high.

TABLE 1

|  | Excess Portion of Electrolyte Solution | | High-Rate Performance Rate of Increase in Resistance [%] | Resistance Against Precipitation of Li Current [A] |
| --- | --- | --- | --- | --- |
|  | At the Time When Allowable SOC Attained to Upper Limit | At the Time When Allowable SOC Attained to Lower Limit | | |
| Comparative Example 1 | Not in Contact | Not in Contact | 132 | 65 |
| Comparative Example 2 | Contact with Electrode | Contact with Electrode | 109 | 60 |
| Comparative Example 3 | Contact with Electrode | Contact Only with Separator | 108 | 65 |
| Comparative Example 4 | Contact Only with Separator | Not in Contact | 115 | 70 |
| Example 1 | Contact Only with Separator | Contact Only with Separator | 108 | 80 |

<Result>

As shown in Table 1, the battery in Comparative Example 1 was high in rate of increase in resistance and low in resistance against precipitation of Li. This may be because, in Comparative Example 1, excess portion 4 of the electrolyte solution was in contact with neither of the electrode (positive electrode 10 and negative electrode 20) and separator 30 at any time (see FIG. 2) and hence dry-up of the electrolyte solution occurred in electrode array 50 and a resistance of the battery increased. Resistance against precipitation of Li is considered as also having lowered with increase in resistance of the battery.

The battery in Comparative Example 2 was lower hi rate of increase in resistance of the battery than in Comparative Example 1 however, it was low in, resistance against precipitation of Li. This may be because, due to the charging and discharging cycle test at a high rate, many SEI films were produced at the surface of negative electrode 20 at a portion of contact between negative electrode 20 and excess portion 4 of the electrolyte solution (see FIG. 3) to increase the resistance, the resistance was varied in negative electrode 20, and Li was precipitated at the surface of negative electrode 20.

The battery in Comparative Example 3 was also lower in rate of increase m resistance of the battery than in Comparative Example 1, however, it was low in resistance against precipitation of Li. This may be because there were portions of contact between negative electrode 20 and excess portion 4 of the electrolyte solution at the time when the allowable SOC attained to the upper limit also in Comparative Example 3 (see FIG. 4(a)), and hence many SEI films were produced at the surface of negative electrode 20 at a portion of contact between negative electrode 20 and excess portion 4 of the electrolyte solution to increase the resistance, the resistance was varied in negative electrode 20, and Li was precipitated at the surface of negative electrode 20 as in Comparative Example 2.

The battery in Comparative Example 4 was high in rate of increase in resistance and low in resistance against precipitation of Li. This may be because excess portion 4 run out before the allowable SOC reached the lower limit in Comparative Example 4 (see FIG. 5(b)) and hence dry-up of the electrolyte solution occurred in electrode array 50 and the resistance of the battery increased. Resistance against precipitation of Li is considered as also having lowered with increase in resistance of the battery.

The battery in Example 1 was lower in rate of increase in resistance and higher in resistance against precipitation of Li than the batteries in Comparative Examples 1 to 4. This may be because dry-up of electrode array 50 was suppressed by contact of separator 30 with excess portion 4 of the electrolyte solution at all times (see FIG. 1). This may also be because excess portion 4 of the electrolyte solution was not in contact with the electrode (negative electrode 20) at any time (see FIG. 1), and hence formation of an SEI film at the surface of negative electrode 20 was suppressed, partial increase, in resistance (variation in resistance) of negative electrode 20 was suppressed, and precipitation of Li at the surface of negative electrode 20 was suppressed. Therefore, it can be seen that the battery in Example 1 is excellent in both of high-rate performance and resistance against precipitation of Li.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A non-aqueous electrolyte secondary battery comprising:
    a housing;
    a stack-type electrode array accommodated in the housing; and
    an electrolyte solution,
    the electrolyte solution including
        an infiltrated portion of the electrolyte solution, which is infiltrated into the stack-type electrode array, and
        an excess portion of the electrolyte solution other than the infiltrated portion,
    the stack-type electrode array including a plurality of positive electrodes, a plurality of negative electrodes, and a plurality of separators,
    the stack-type electrode array being formed by alternately stacking the positive electrode and the negative electrode with the separator being interposed,
    in a set-up state that the non-aqueous electrolyte secondary battery is arranged such that a direction of stack of the stack-type electrode array is orthogonal to a vertical direction, the non-aqueous electrolyte secondary battery being constructed such that a lower end of the separator projects below lower ends of the positive electrode and the negative electrode, and
    in the set-up state, the non-aqueous electrolyte secondary battery being constructed such that a projecting portion of any of the plurality of separators is always in contact with the excess portion of the electrolyte solution, and the plurality of positive electrodes and the plurality of negative electrodes are not in contact with the excess portion of the electrolyte solution at any time, within a range of an operating state of charge in which a state of charge of the non-aqueous electrolyte secondary battery is not lower than a lower limit value of an allowable state of charge and not higher than an upper limit value of the allowable state of charge.

2. The non-aqueous electrolyte secondary battery according to claim 1, wherein in the set-up state, the projecting portion of any of the plurality of separators is in contact with the housing.

3. The non-aqueous electrolyte secondary battery according to claim 1, wherein the lower limit value of the allowable state of charge is not higher than 20% and the upper limit value of the allowable state of charge is not lower than 80%.

\* \* \* \* \*

UNITED STATES PATENT AND TRADEMARK OFFICE
CERTIFICATE OF CORRECTION

PATENT NO. : 10,797,355 B2  
APPLICATION NO. : 16/253716  
DATED : October 6, 2020  
INVENTOR(S) : Hiroki Iguchi It is certified that error appears in the above-identified patent and that said Letters Patent is hereby corrected as shown below:

On the Title Page

Item (72), inventor 1, city, delete "Nagoya" and insert --Nagoya-shi Aichi-ken--, therefor.

In the Specification

In Column 1, Line(s) 25, after "in", delete ",".

In Column 1, Line(s) 47, after "portion", delete ",".

In Column 2, Line(s) 27, after "salt", delete ",".

In Column 3, Line(s) 42, after "an", delete ",".

In Column 4, Line(s) 2, after "stored", insert --,--.

In Column 4, Line(s) 7, delete "wrist acted" and insert --constructed--, therefor.

In Column 4, Line(s) 34, after "in", delete ",".

In Column 5, Line(s) 5, delete "Electrode" and insert --Positive Electrode--, therefor.

In Column 5, Line(s) 15 & 16, delete "can cut" and insert --current--, therefor.

In Column 5, Line(s) 25, after "μm", insert --.--.

In Column 5, Line(s) 34, after "LiCoO2,", insert --LiNiO$_2$,--.

In Column 5, Line(s) 38, after "electrode", delete "10".

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,797,355 B2

In Column 5, Line(s) 50, delete "UMC" and insert --CMC--, therefor.

In Column 6, Line(s) 28, after "alone", insert --,--.

In Column 6, Line(s) 39, after "stacking", insert --a--.

In Column 7, Line(s) 25, after "(HV)", insert --,--.

In Column 7, Line(s) 25, delete "(LV)" and insert --(EV)--, therefor.

In Column 7, Line(s) 26, after "(PHV)", delete "," and insert --.--, therefor.

In Column 7, Line(s) 62, delete "Had" and insert --had--, therefor.

In Column 7, Line(s) 65, after "prepared", delete "," and insert --.--, therefor.

In Column 8, Line(s) 6, delete "at" and insert --of--, therefor.

In Column 8, Line(s) 23, delete "water" and insert --coater--, therefor.

In Column 8, Line(s) 24, delete "at" and insert --of--, therefor.

In Column 8, Line(s) 44, after "as", delete "au" and insert --an--, therefor.

In Column 9, Line(s) 43, delete "Limit" and insert --limit--, therefor.

In Column 9, Line(s) 43, delete "3(a)" and insert --4(a)--, therefor.

In Column 10, Line(s) 14, delete "35%" and insert --85%--, therefor.

In Column 10, Line(s) 14, delete "Alter" and insert --After--, therefor.

In Column 10, Line(s) 31, after "an", delete ",".

In Column 10, Line(s) 45, delete "environtnent" and insert --environment--, therefor.

In Column 11, Line(s) 32, delete "hi" and insert --in--, therefor.

In Column 11, Line(s) 34, after "in", delete ",".

In Column 11, Line(s) 44, after "increase", delete "m" and insert --in--, therefor.

In Column 12, Line(s) 28, after "increase", delete ",".